(12) United States Patent
Ryoo et al.

(10) Patent No.: US 8,356,535 B2
(45) Date of Patent: Jan. 22, 2013

(54) PRECISION MACHINING APPARATUS

(75) Inventors: Jae Sik Ryoo, Gyunggi-do (KR); Tae Jun Choi, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 665 days.

(21) Appl. No.: 12/588,089

(22) Filed: Oct. 2, 2009

(65) Prior Publication Data

US 2010/0225038 A1   Sep. 9, 2010

(30) Foreign Application Priority Data

Mar. 5, 2009  (KR) .................. 10-2009-0019004

(51) Int. Cl.
*B23B 3/00*    (2006.01)
*B23B 25/06*   (2006.01)
(52) U.S. Cl. .......................................... 82/162; 82/170
(58) Field of Classification Search ............ 82/158, 82/162, 165, 170, 118
See application file for complete search history.

(56) References Cited

U.S. PATENT DOCUMENTS

| | | | | |
|---|---|---|---|---|
| 1,513,883 A * | 11/1924 | Bausch | ............................. | 82/12 |
| 2,524,170 A * | 10/1950 | Johnson | .......................... | 82/158 |
| 3,015,914 A * | 1/1962 | Roney | ............................ | 451/160 |
| 3,088,249 A * | 5/1963 | Pope et al. | .................... | 451/246 |
| 3,456,397 A * | 7/1969 | Songhurst et al. | ............ | 451/374 |
| 3,738,204 A * | 6/1973 | Spriggs | ......................... | 82/1.11 |
| 3,893,356 A * | 7/1975 | Atzberger | ....................... | 82/158 |
| 3,916,739 A * | 11/1975 | Nomura | ......................... | 82/158 |
| 6,476,971 B1 * | 11/2002 | Border et al. | ................. | 359/619 |
| 6,647,840 B2 * | 11/2003 | Luik | ............................... | 82/118 |
| 6,846,137 B1 * | 1/2005 | Border et al. | ................. | 409/163 |
| 6,908,266 B1 * | 6/2005 | Border et al. | ................. | 409/226 |
| 7,243,582 B1 * | 7/2007 | Launius | ......................... | 82/104 |

FOREIGN PATENT DOCUMENTS

| | | |
|---|---|---|
| JP | 5-245708 | 9/1993 |
| JP | 8-174302 | 7/1996 |
| JP | 2005-118920 | 5/2005 |
| KR | 1996-0013569 | 5/1996 |

OTHER PUBLICATIONS

Korean Office Action issued Feb. 18, 2011 in corresponding Korean Patent Application 10-2009-0019004.

* cited by examiner

*Primary Examiner* — Will Fridie, Jr.

(57) ABSTRACT

A precision machining apparatus includes a bite machining an object being rotated, according to a correction value, a fixing jig closely attaching the object to the bite and rotatably fixing the object, an optical unit magnifying and verifying a machining position on the object being rotated, a height control part controlling a height of the bite according to the machining position on the object, and an interval control part connected to an end portion of the bite and controlling an interval between the bite and the object.

12 Claims, 6 Drawing Sheets

PRECISION MACHINING APPARATUS

CROSS-REFERENCE TO RELATED APPLICATIONS

This application claims the priority of Korean Patent Application No. 10-2009-0019004 filed on Mar. 5, 2009, in the Korean Intellectual Property Office, the disclosure of which is incorporated herein by reference.

BACKGROUND OF THE INVENTION

1. Field of the Invention

The present invention relates to a precision machining apparatus, and more particularly, to an apparatus for precisely machining an object by correcting the dimensions of the object.

2. Description of the Related Art

The recent development of communications techniques and digital information processing techniques have led to an increase in precision devices such as multifunctional mobile terminals capable of information processing, computation, communication, the input/output of image information, and the like.

Such precision devices are required to be slimmer and smaller, and internal components installed inside the precision devices are also required to have high-precision dimensions.

For example, when an ultra-precision screw is assembled in a fine component, product quality is significantly affected by dimensional errors in fine pitch, effective diameter or the like. Even an error of just a few microns may exceed tolerance ranges, resulting in many defects.

When such defects occur, fine components may be re-machined. However, in actuality, the re-machining of fine components is a very difficult process due to hard-to-control factors such as positioning errors, setting errors, machine noise, thermal deformation and the like.

That is, a method of remanufacturing only a defective component is used when defects occur. However, this remanufacturing method is disadvantageous in terms of time and costs.

Consequently, there is an increasing demand for apparatuses capable of accurately correcting a defective fine component within the range of effective dimensions, while controlling the above factors properly.

SUMMARY OF THE INVENTION

An aspect of the present invention provides a precision machining apparatus capable of precisely correcting a fine component within the range of effective dimensions when a defect occurs in the fine component.

According to an aspect of the present invention, there is provided a precision machining apparatus including: a bite machining a object being rotated; a fixing jig closely attaching the object to the bite and rotatably fixing the object; an optical unit magnifying and verifying a machining position on the object; and a location control unit controlling a location of the bite.

The fixing jig may include a pressurization part pressurizing and fixing the object; and a driving part moving the pressurization part toward the object.

The fixing jig may include a bearing pressurizing the object and allowing the object to rotate.

The fixing jig may include a pressurization part pressurizing and fixing the object, the pressurization part having a lower portion with a smaller width than that of an upper portion thereof.

The fixing jig may include a fixing block including a mounting groove having a V-shape corresponding to the pressurization part and receiving the object.

According to another aspect of the present invention, there is provided a precision machining apparatus including: a bite machining an object being rotated, according to a correction value; a fixing jig closely attaching the object to the bite and rotatably fixing the object; an optical unit magnifying and verifying a machining position on the object being rotated; a height control part controlling a height of the bite according to the machining position on the object; and an interval control part connected to an end portion of the bite and controlling an interval between the bite and the object.

The height control part may include an operation portion accommodating the bite such that a cutting edge of the bite is exposed, the operation portion being movable to control the height of the bite, and a guide protruding from the operation portion. The fixing jig may include a groove formed in a vertical direction and allowing the guide to move therein.

The fixing jig may include a protruding piece protruding in a vertical direction. The height control part may include an operation portion accommodating the bite such that a cutting edge of the bite is exposed, the operation portion being movable to control a height of the bite, and a groove formed in the operation portion, having a shape corresponding to the protruding piece and engaged with the protruding piece.

The precision machining apparatus may further include an elastic member mounted on the interval control part and providing an elastic force to the bite relative to a distance to which the bite moves toward the object.

The interval control part may include a micrometer having an end portion on which the bite is mounted, and the height control part may include a receiving groove receiving the micrometer to support the micrometer.

The receiving groove may include a stopper for preventing the bite from moving further than a predetermined distance toward the object.

The fixing jig may include: a pressurization part pressurizing and fixing the object from above; and a driving part moving the pressurization part toward the object.

The fixing jig may include a bearing mounted on an end portion of the pressurization part and allowing the object fixed to the fixing jig to rotate.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

The invention may, however, be embodied in many different forms and should not be construed as limited to the embodiments set forth herein. While those skilled in the art could readily devise many other varied embodiments that incorporate the teachings of the present invention through the addition, modification or deletion of elements, such embodiments may fall within the scope of the present invention.

Figure 1:
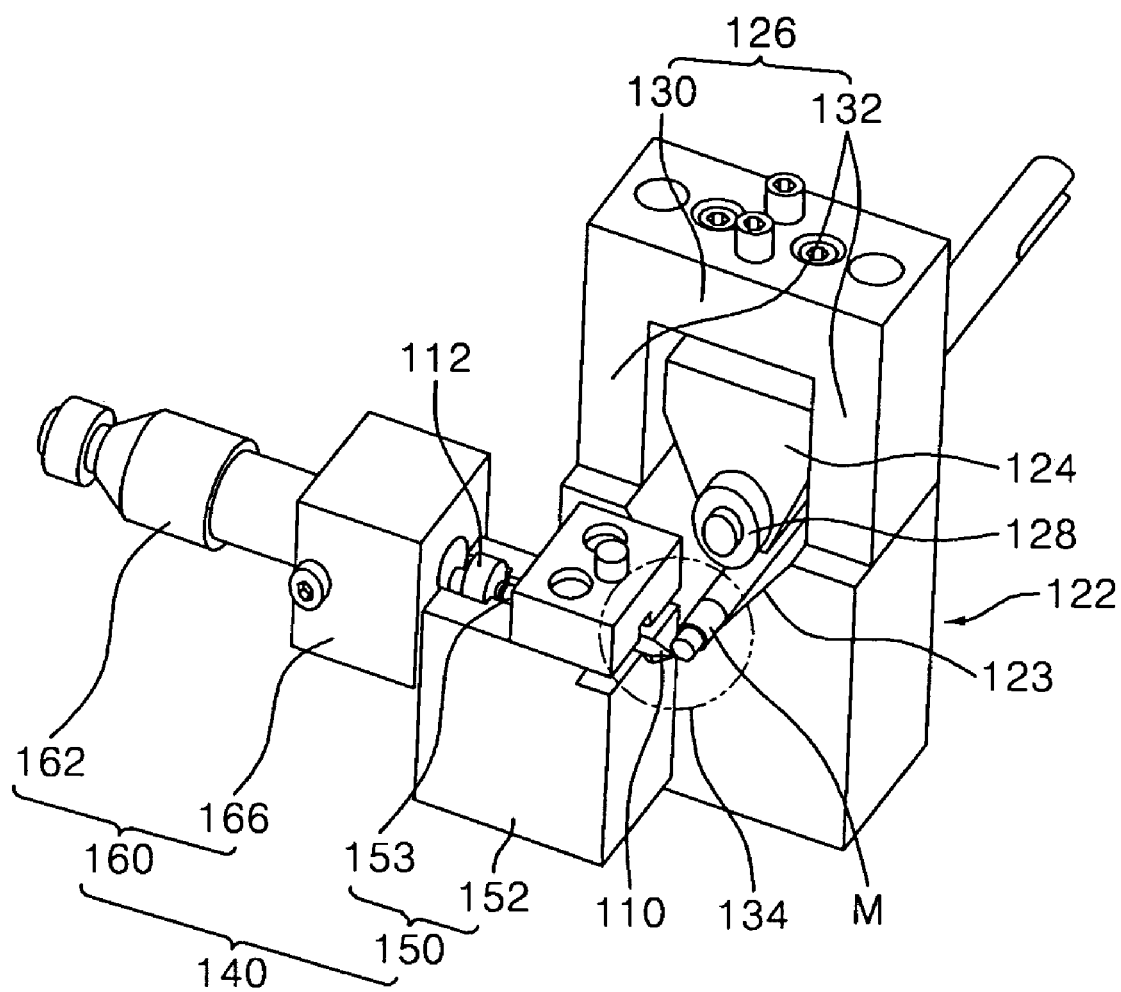
FIG. 1 is a perspective view illustrating a precision machining apparatus according to an exemplary embodiment of the present invention.
Figure 2:
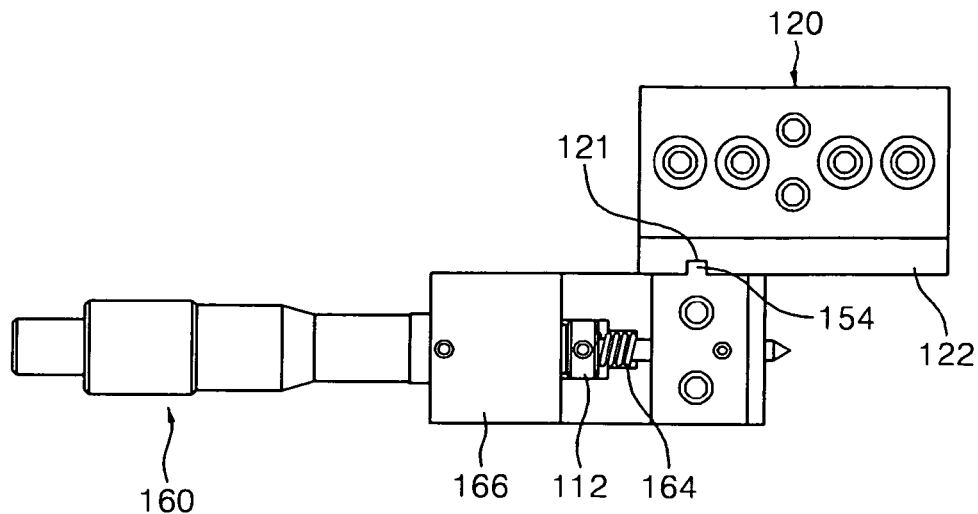
FIG. 2 is a top view illustrating the precision machining apparatus of FIG. 1.

FIG. 1 is a perspective view illustrating a precision machining apparatus according to an exemplary embodiment of the present invention. FIG. 2 is a top view of the precision machining apparatus of FIG. 1, and FIG. 3 is a front view of the precision machining apparatus of FIG. 1.

Figure 3:
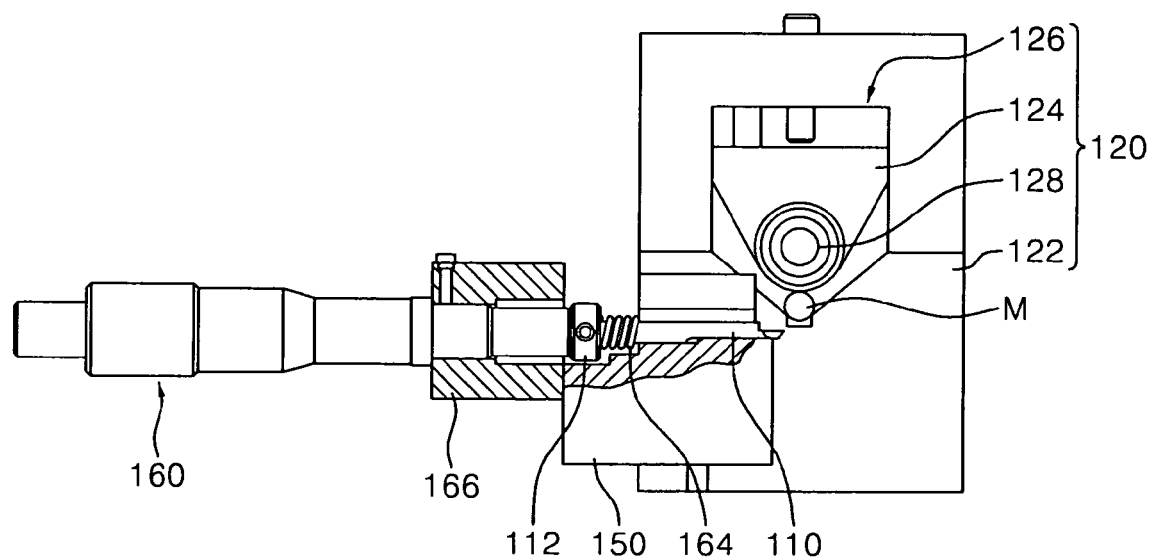
FIG. 3 is a front view illustrating the precision machining apparatus of FIG. 1.

Referring to FIGS. 1 through 3, a precision machining apparatus 100 includes a bite 110, a fixing jig 120, an optical unit 134, and a location control unit 140.

The bite 110 refers to a tool provided with a cutting edge and mounted on a machine tool such as a lathe to shape metal. According to this embodiment, the bite 110 is mounted on the end portion of a micrometer 162 and machines an object M that is rotating.

The bite 110 is a rounded-edge bite having a rounded cutting edge. As the rotating object M contacts the surface of the bite 110, an unnecessary portion of the object M is removed.

However, the bite in the present invention is not limited to the rounded-edge bite. Cutting edges with various shapes are applicable to the bite according to a designer's intention. In detail, the bite may utilize a thread cutting bite that forms a thread, a cut-off bite, a straight bite that forms a plane, and a sword bite having a pointed tip.

The bite 110 is mounted on the end portion of the micrometer 162 and received in a height control part 150. A portion of the bite 110 is exposed to the outside and is thus placed adjacent to the object M.

The fixing jig 120 fixes the rotatable object M such that the object M be closely attached to the bite 110. This enables the bite 110 to machine the object M.

According to this embodiment, the fixing jig 120 includes a fixing block 122 having a mounting groove 123 having a V-shape corresponding to a pressurization part and receiving the object M, a pressurization part 124 pressurizing and fixing the object M, a driving part 126 moving the pressurization part 124 toward the object M, and a bearing 128 pressurizing the object M while allowing the object M to rotate.

The fixing block 122 has a V-shaped mounting groove 123 in its top portion to receive the object M. The shape of the mounting groove 123 is not limited to the V-shape but it may have a shape having a width reducing toward a lower portion.

The bottom of the fixing block 122 is supported by the ground, and the object M is received in the mounting groove 123 formed in the top portion. Thus, the fixing block 122 supports the object M underneath, while the pressurization part 124 pressurizes the object M from above.

The fixing block 122 has a groove 121 to allow the height control part 150 to move up and down (vertically). The height control part 150 has a protruding piece 154 assembled into the groove 121, thus moving along the groove 121.

The pressurization part 124 is placed above the fixing block 122, and can move downwardly towards the object M. Therefore, the pressurization part 124 is mounted on the driving part 126 so as to move vertically.

The bearing 128, which contacts the object M, is mounted on the end portion of the pressurization part 124. The bearing 128 is formed in a round shape to be rotatable with the object M.

The driving part 126 is disposed above the fixing block 122 and provides a space in which the object M is received between itself and the fixing block 122.

The driving part 126 may include two support portions 132 and a connection portion 130 connecting the two support portions 132. The pressurization part 124 may be assembled to the connection portion 130 so as to be vertically movable. A screw is formed on the top surface of the connection portion 130 to move the pressurization part 124 vertically. By rotating the screw, the location of the pressurization part 124 may be controlled.

The pressurization part 124 is disposed between the two support portions 132 of the driving part 126, and may be movably mounted on the bottom surface of the connection portion 130 of the driving part 126. The pressurization part 124 moves up and down to pressurize and fix the object M from above.

However, the fixing jig 120 is not limited to pressing and fixing the object M from above, and may be designed to press and fix the object M from below according to a designer's intention.

The pressurization part 124 has a shape tapered in width toward its lower end, and the bearing 128 may be mounted on the lower end portion of the pressurization part 124. The pressurization part 124 may be tapered corresponding to the shape of the mounting groove 123 in the fixing block 122. This ensures the more stable fixation of the object M in the mounting groove 123.

The bearing 128, mounted on the end portion of the pressurization part 124, moves along with the pressurization part 124 that is moving downwards, and directly contacts and pressurizes the object M. The object M having a rotatable shape can rotate after being fixed to the fixing jig 120 by the bearing 128.

The optical unit 134 is placed to face the object M and the bite 110 in order to magnify and check a machining position on the rotating object M. Accordingly, an operator can verify an accurate machining position (a position on the object M where machining is to be performed) through the optical unit 134, and the location control unit 140 controls the location of the bite 110 according to the machining position on the object M, thereby allowing for the execution of operations with precision.

The optical unit 134 may be formed integrally with the precision machining apparatus. The optical unit 134 may be designed so as to be rotatably mounted on the fixing block 122, or integrally mounted on the location control unit 140.

However, the optical unit 134 is not limited to the description, and may be formed separately from the precision machining apparatus. A separate microscope or the like may be disposed as the optical unit 134. Also, the optical unit 134 may be able to control the magnification thereof according to a correction value for the object M. Here, the correction value refers to an extent to which the object M needs to be corrected.

The location control unit 140 controls the location of the bite 110 according to the machining position of the object M. The location control unit 140 includes the height control part 150 for controlling the height of the bite 110 according to the machining position of the object M, and an interval control part 160 connected to the end portion of the bite 110 and controlling the interval between the bite 110 and the object M.

However, the location control unit 140 is not limited to controlling the location and interval of the bite 110, and may be designed to control the location of the bite 110 variously according to a designer's intention, such as controlling the angle of the bite 110.

The height control part 150 includes an operation portion 152 having a hexahedral shape, and a receiving groove 153 provided in the top surface of the operation portion 152 to receive the bite 110.

The receiving groove 153 receives the bite 110 such that the round cutting edge of the bite 110 is exposed. The receiving groove 153 also receives the end portion of the micrometer 162 on which the bite 110 is mounted, and an elastic member 164 compressed by the movement of the micrometer 162.

The protruding piece 154 protrudes from the side surface of the operation portion 152 toward the fixing jig 120. The protruding piece 154 is assembled into a groove 121 provided in the fixing jig 120 in a vertical direction, such that the operation portion 152 can move vertically with respect to the fixing jig 120.

The interval control part 160 has one end received in the height control part 150 and may be formed integrally with the height control part 150. Also, the interval control part 160 may include the micrometer 162 connected to the end portion of the bite 110.

The interval control part 160 includes a fixing frame 166 fixed integrally with the height control part 150. The micrometer 162 passes through the inside of the fixing frame 166, and may be fixed to the fixing frame by screw-coupling.

The micrometer 162 may refer to a length measuring device employing a screw with a precise pitch. The micrometer 162 includes a spindle with a highly precise pitch, thereby enabling precise interval control. However, the interval control part 160 is not limited merely to the micrometer.

The bite 110 is detachably mounted on the micrometer 162, and thus various bites may be applied thereto according to operational purposes.

A bite connection portion 112 may be provided at the end portion of the micrometer 162 for the mounting of the bite 110.

The elastic member 164 utilizes a coil spring having one end contacting the bite connection portion 112 and the other end fixed to the inner wall of the receiving groove 153 of the height control part 150. The coil spring is wound around the bite 110.

Figure 4:
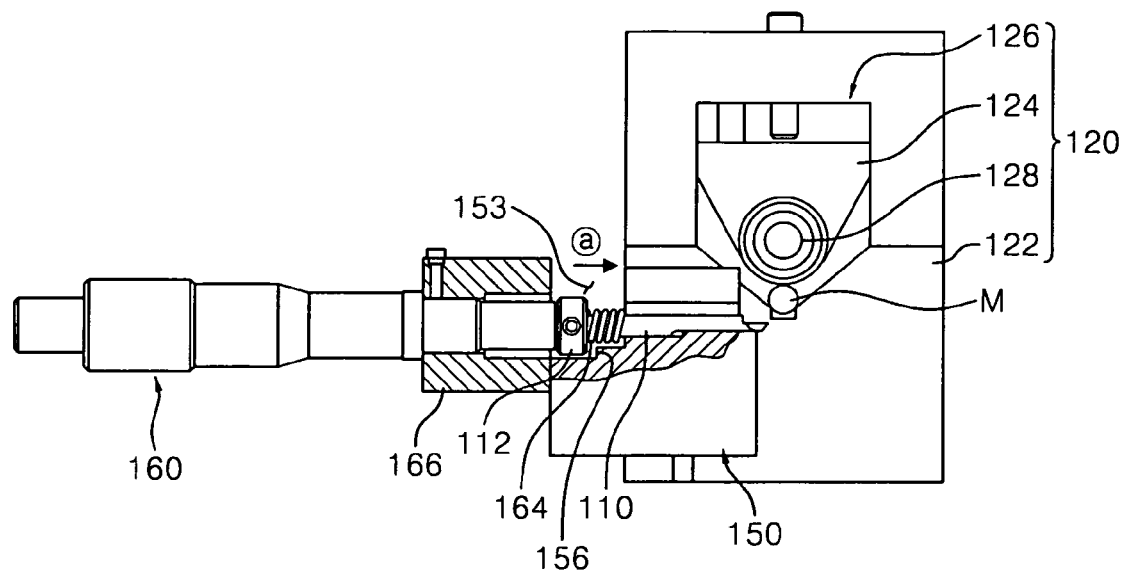
FIGS. 4 and 5 are schematic cross-sectional views illustrating an interval control part in the precision machining apparatus according to the exemplary embodiment of the present invention.
Figure 5:
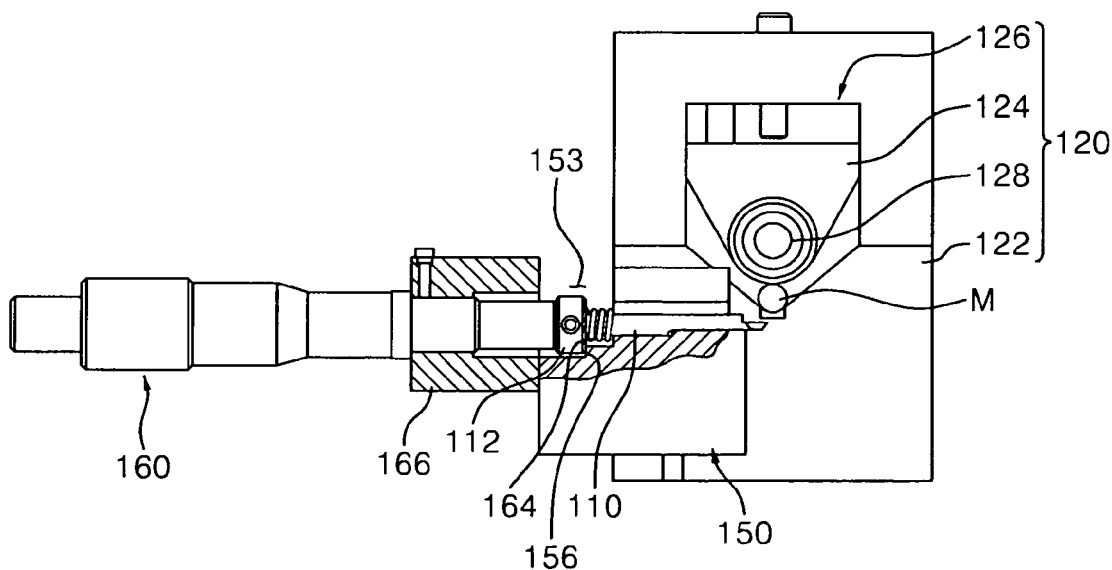

FIGS. 4 and 5 are schematic cross-sectional views for explaining the interval control part in the precision machining apparatus according to the exemplary embodiment of the present invention.

Referring to FIGS. 4 and 5, the interval control part 160 controls the interval between the bite 110 and the object M.

Accordingly, the bite 110 can move toward the object M with precision, corresponding to the machining position on the object M.

To move the bite 110 toward the object M, the micrometer 162 is rotated in one direction, thereby moving the bite 110 toward the object M to a predetermined distance.

As indicated by (a) in FIG. 4, the elastic member 164 is compressed by the distance to which the micrometer 162 moves the bite 110 toward the object M. At this time, if the micrometer 162 moves away from the object M, the bite 110 is also moved rearwards due to the force of the compressed elastic member 164.

A stopper 156 may be provided inside the receiving groove 153 in order to prevent the bite 110 from being moved further than a predetermined distance by the micrometer 162.

Using the interval control part 160 may facilitate the control of an interval between the bite 110 and the object M, and the micrometer 162 may allow the precise control of the interval between the bite 110 and the object M.

Figure 6:
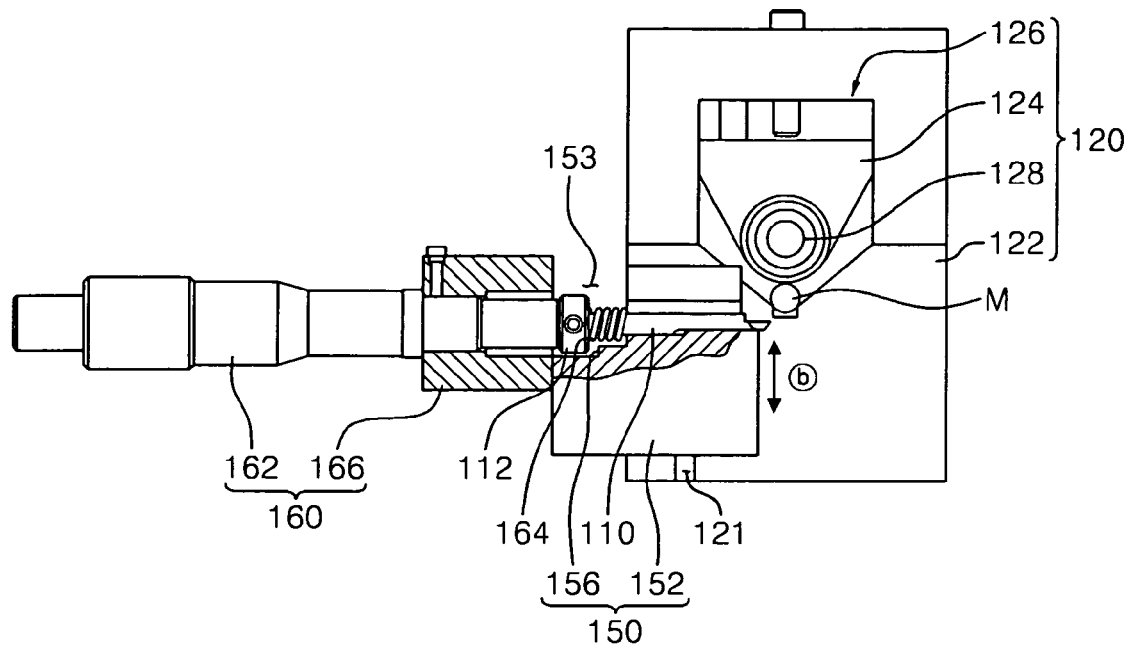
FIGS. 6 and 7 are schematic cross-sectional views illustrating a height control part in the precision machining apparatus according to the exemplary embodiment of the present invention.
Figure 7:
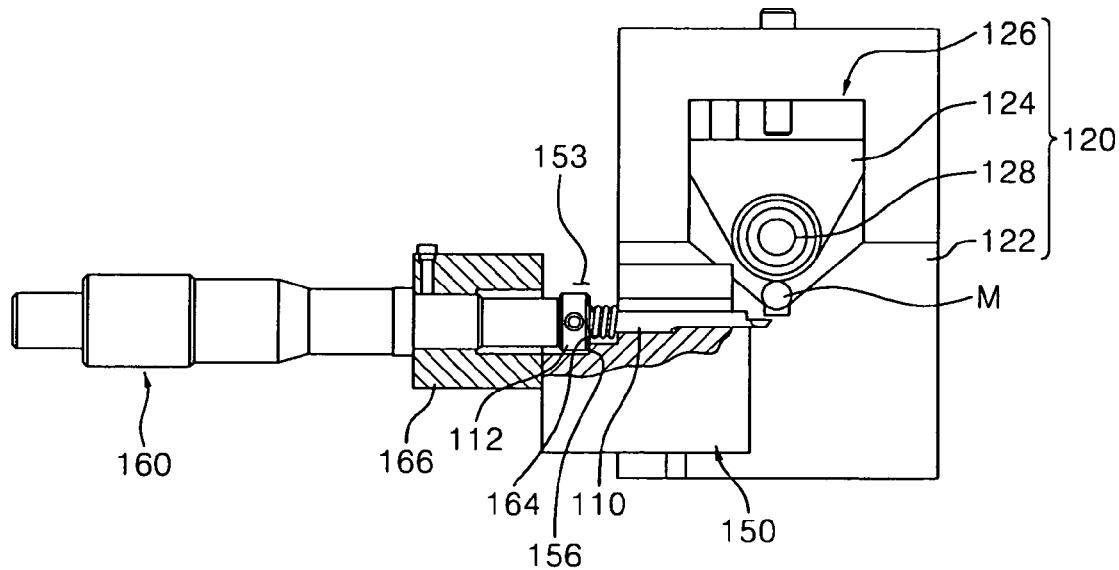

FIGS. 6 and 7 are schematic cross-sectional views for explaining the height control part in the precision machining apparatus according to the exemplary embodiment of the present invention.

Referring to FIGS. 6 and 7, the height control part 150 controls the height of the bite 110 corresponding to the machining position of the object M.

The bite 110 is received in the receiving groove 153, formed in the top portion of the operation portion 152, with its cutting edge exposed to the outside. Also, the receiving groove receives the end portion of the micrometer 162 on which the bite 110 is mounted, and the elastic member 164 compressed by the movement of the micrometer 162.

The receiving groove 153 may be provided with the stopper 156 protruding in order to prevent the bite 110 from moving further than a predetermined distance toward the object.

Also, the protruding piece 154 is formed at the side surface of the operation portion 152 as shown in FIG. 2. Thus, as indicated by (b) in FIG. 6, the protruding piece 154 moves vertically with respect to the fixing block 122 along the groove 121 provided vertically in the side surface of the fixing block 122.

Accordingly, the bite 110 can be moved vertically by the height control part 150, according to the size of the object M, thereby contacting the machining position with precision.

However, the structure for moving the height control part 150 up and down is not limited to the above description. The fixing jig may include a protruding piece protruding vertically. The height control part may include an operation portion that accommodates the bite such that the cutting edge of the bite is exposed and can move to control the height of the bite, and a groove formed in the operation portion, having a shape corresponding to the protruding piece and engaged with the protruding piece.

Figure 8:
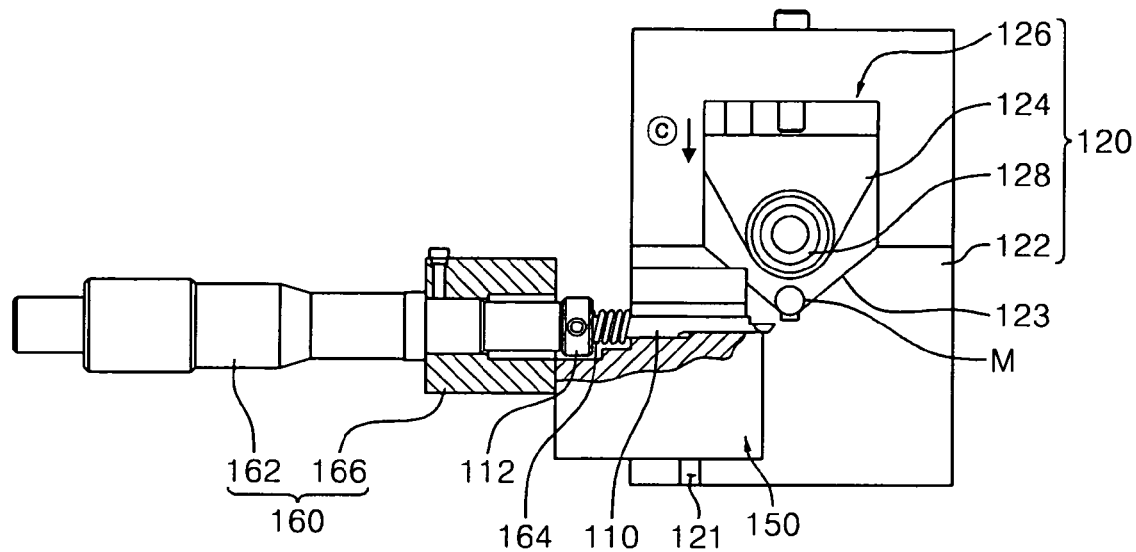
FIGS. 8 and 9 are schematic cross-sectional views illustrating a fixing jig in the precision machining apparatus, according to the exemplary embodiment of the present invention.
Figure 9:
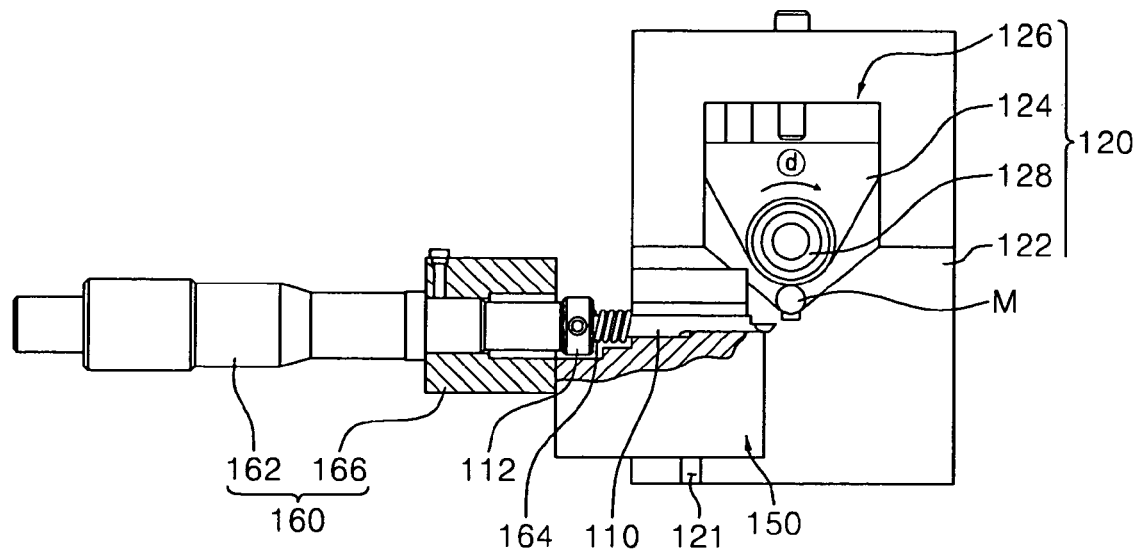

FIGS. 8 and 9 are schematic cross-sectional views for explaining the fixing jig in the precision machining apparatus according to the exemplary embodiment of the present invention.

Referring to FIGS. 8 and 9, the fixing jig 120 fixes the rotatable object M such that the object M contacts the bite 110, thus enabling the machining operation of the bite 110.

The fixing block 122 includes the V-shaped mounting groove 123 in the top portion thereof to receive the object M. The fixing block 122 has its bottom surface supported by the ground, and the object M is received in the mounting groove 123. As the pressurization part 124 pressurizes the object M received in the mounting groove 123 from above, the location of the object M is fixed.

At this time, to pressurize and fix the object M from above, the pressurization part 124 moves toward the object M as indicated by ⓒ in FIG. 8 and pressurizes the object M with the bearing 128 fixed to the end portion of the pressurization part 124.

When an operator rotates the object M from the outside, the object M is fixed in position while being rotatable together with the bearing 128 as indicated by ⓓ in FIG. 9.

Figure 10:
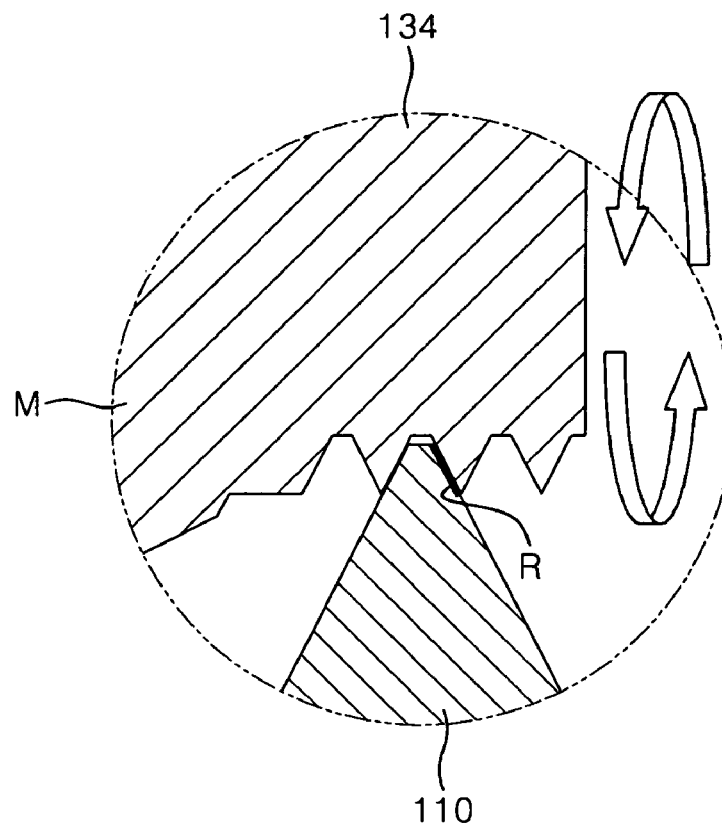
FIG. 10 is a schematic front view illustrating an optical unit in the precision machining apparatus according to the exemplary embodiment of the present invention.

FIG. 10 is a schematic front view for explaining the optical unit in the precision machining apparatus according to the exemplary embodiment of the present invention.

Referring to FIG. 10, the optical unit 134 allows the operation to be performed, viewed through a magnified image of the object M and the bite 110. If the object M has a defect exceeding a tolerance range on a micron scale, the magnification of a lens is adjusted to magnify the image appropriately.

When a target R of removal is verified, the bite 110 is moved to a machining position on the object M for the removal of the target R.

When the bite 110 is placed accurately on the machining position of the object M, the object M is rotated as indicated by arrows in FIG. 10. The object M may be rotated simply by an operator. However, the rotation method is not limited to the description. The object M may be designed to have a structure enabling automatic rotation.

By the rotation of the object M, the bite 110 easily removes the target R of removal.

Consequently, the precision machining apparatus according to this embodiment includes the location control unit 140 and the optical unit 134, thereby machining the object M with precision according to a correction value of the object M. Accordingly, economic losses incurred through discarding defective objects can be prevented, and inefficiency due to remanufacturing an object M can also be prevented.

Also, the precision machining apparatus according to this embodiment requires (relatively) low manufacturing costs since it can be simply manufactured without a complex configuration, and achieves a reduction in size, thereby allowing for a simple correction operation in the scene of action.

Figure 11:
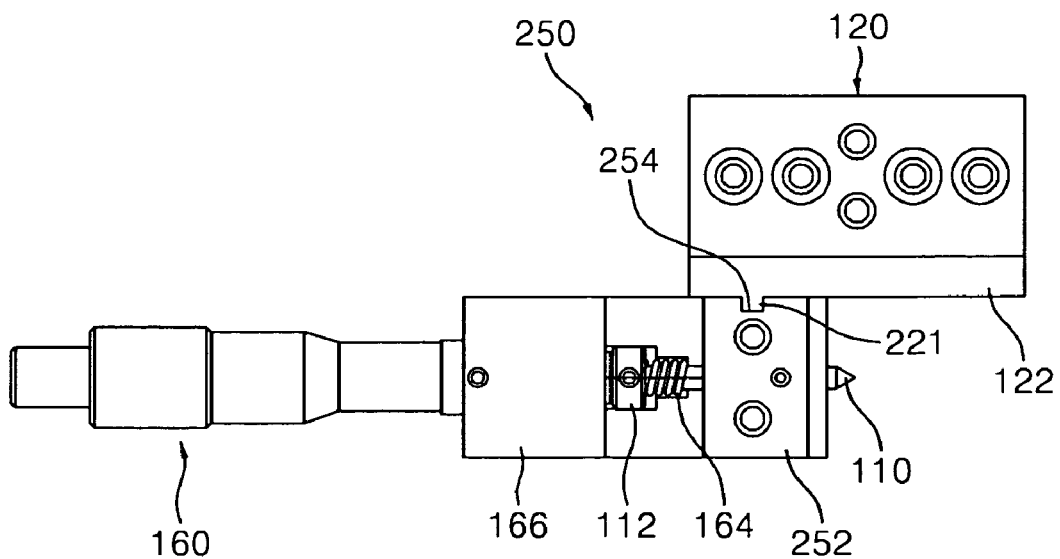
FIG. 11 is a top view illustrating a precision machining apparatus according to another exemplary embodiment of the present invention.

FIG. 11 is a top view for explaining a precision machining apparatus according to another exemplary embodiment of the present invention.

Referring to FIG. 11, the fixing jig 120 includes a protruding piece 221 protruding in a vertical direction.

A height control part 250 may include an operation portion 252 accommodating the bite 110 such that the cutting edge of the bite 110 is exposed, and being movable to control the height of the bite 110, and a groove 254 formed in the operation portion 251, having a shape corresponding to the protruding piece 221 and engaged with the protruding piece 221.

Accordingly, the height control part 250 moves up and down with respect to the fixing block 122 with the groove 254 engaged with the protruding piece 221.

As set forth above, according to exemplary embodiments of the invention, the precision machining apparatus includes the location control unit and the optical unit, thus machining an object with precision according to a correction value.

Accordingly, economic losses incurred through discarding defective objects can be prevented, and inefficiency due to remanufacturing an object M can also be prevented.

Also, the precision machining apparatus according to this embodiment requires (relatively) low manufacturing costs since it can be simply manufactured without a complex configuration. Also, the precision machining apparatus achieves a reduction in size, thereby allowing for a simple correction operation in the scene of action.

While the present invention has been shown and described in connection with the exemplary embodiments, it will be apparent to those skilled in the art that modifications and variations can be made without departing from the spirit and scope of the invention as defined by the appended claims.

What is claimed is:

1. A precision machining apparatus comprising:
   a bite machining an object being rotated;
   a fixing jig closely attaching the object to the bite and rotatably fixing the object;
   an optical unit magnifying and verifying a machining position on the object; and
   a location control unit controlling a location of the bite,
   the fixing jig including a pressurization part pressurizing and fixing the object, the pressurization part having a lower portion with a smaller width than that of an upper portion thereof.

2. The precision machining apparatus of claim 1, wherein the fixing jig includes:
   a pressurization part pressurizing and fixing the object; and
   a driving part moving the pressurization part toward the object.

3. The precision machining apparatus of claim 1, wherein the fixing jig includes a bearing pressurizing the object and allowing the object to rotate.

4. The precision machining apparatus of claim 1, wherein the fixing jig includes a fixing block including a mounting groove having a V-shape corresponding to the pressurization part and receiving the object.

5. A precision machining apparatus comprising:
   a bite machining an object being rotated, according to a correction value;
   a fixing jig closely attaching the object to the bite and rotatably fixing the object;
   an optical unit magnifying and verifying a machining position on the object being rotated;
   a height control part controlling a height of the bite according to the machining position on the object; and
   an interval control part connected to an end portion of the bite and controlling an interval between the bite and the object.

6. The precision machining apparatus of claim 5, wherein the height control part includes an operation portion accommodating the bite such that a cutting edge of the bite is exposed, the operation portion being movable to control the height of the bite, and a guide protruding from the operation portion, and
   the fixing jig includes a groove formed in a vertical direction and allowing the guide to move therein.

7. The precision machining apparatus of claim 5, wherein the fixing jig includes a protruding piece protruding in a vertical direction, and
   the height control part includes an operation portion accommodating the bite such that a cutting edge of the bite is exposed, the operation portion being movable to control a height of the bite, and a groove formed in the operation portion, having a shape corresponding to the protruding piece and engaged with the protruding piece.

8. The precision machining apparatus of claim 5, further comprising an elastic member mounted on the interval control part and providing an elastic force to the bite relative to a distance to which the bite moves toward the object.

9. The precision machining apparatus of claim 5, wherein the interval control part includes a micrometer having an end portion on which the bite is mounted, and
   the height control part includes a receiving groove receiving the micrometer to support the micrometer.

10. The precision machining apparatus of claim 9, wherein the receiving groove includes a stopper for preventing the bite from moving further than a predetermined distance toward the object.

11. The precision machining apparatus of claim 5, wherein the fixing jig includes:
- a pressurization part pressurizing and fixing the object from above; and
- a driving part moving the pressurization part toward the object.

12. The precision machining apparatus of claim 5, wherein the fixing jig includes a bearing mounted on an end portion of the pressurization part and allowing the object fixed to the fixing jig to rotate.

* * * * *